United States Patent
Brown et al.

[15] 3,670,889
[45] June 20, 1972

[54] FLUID FILTER DEVICE HAVING BYPASS AND INDICATOR MEANS

[72] Inventors: Carl A. Brown, Birmingham; Frederick L. Walter, Orchard Lake, both of Mich.

[73] Assignee: Parker-Hannifin Corporation, Cleveland, Ohio

[22] Filed: June 1, 1970

[21] Appl. No.: 42,030

[52] U.S. Cl. ................................. 210/90, 116/70, 210/130
[51] Int. Cl. ........................................... B01d 27/10
[58] Field of Search ............... 116/70; 210/90, 91, 130, 133

[56] References Cited

UNITED STATES PATENTS

| | | | |
|---|---|---|---|
| 3,150,633 | 9/1964 | Holl | 116/70 |
| 3,146,757 | 9/1964 | Heymann et al. | 210/90 X |
| 3,422,791 | 1/1969 | Rosaen | 210/90 X |
| 3,052,206 | 9/1962 | Scavuzzo | 210/90 X |
| 3,420,375 | 1/1969 | Kudlaty et al. | 210/90 |
| 3,442,384 | 5/1969 | Downey et al. | 210/90 |

*Primary Examiner*—Samih N. Zaharna
*Attorney*—Hauke, Gifford and Patalidis

[57] ABSTRACT

A fluid filter device of the type wherein a portion of the housing containing the filter element is adapted to be spun off from a cap member and to be disposed of with the filter element. The cap member is provided along with an inlet and an outlet respectively in fluid communication with the exterior and interior of the filter element for filtering fluid passing therethrough. A pressure responsive bypass valve is operable to directly connect the inlet with the outlet when the filter element becomes clogged by a predetermined amount. The bypass valve includes means operatively connecting it to an indicating means mounted exteriorly of the filter device to provide a visual indication to an attendant of the condition of the filtering element and the position of the bypass valve.

1 Claim, 6 Drawing Figures

PATENTED JUN 20 1972 3,670,889

INVENTORS
CARL A. BROWN
FREDERICK L. WALTER
BY
Hauke Gifford & Patalidis
—Attorneys—

3,670,889

FLUID FILTER DEVICE HAVING BYPASS AND INDICATOR MEANS

BACKGROUND OF THE INVENTION

1. Field of the Invention

This invention relates to fluid filter devices, and more particularly to a so-called "spin off" filter element wherein an indicating means and a bypass valve are contained within the cap member of the filter device.

2. Description of the Prior Art

Heretofore, filter devices of the "spin off" type have included bypass valves and indicating means connected to the bypass valve to show that the bypass valve is open and that fluid is bypassing a fluid filter element contained within the device. Such devices have also included indicating means which indicate the condition of the filter element as it accumulates foreign particles prior to the bypass valve becoming operative. Such indicating means provides the machine attendant with a visual indication of the filter element prior to actual bypassing thereof so that it becomes apparent to the attendant that the filter element is becoming clogged and provides him with sufficient time to replace the filter element before it becomes clogged to the extent that bypassing will occur.

Such bypass valves and indicating means used in the past have generally been constructed of elaborate mechanisms which, in certain instances, require calibration and do not satisfactorily indicate when the filter element needs replacement. In addition, such previously used bypass valves and indicating means have not been compact in their construction and thus have not been particularly suitable for use with filter devices of the "spin off" type.

SUMMARY OF THE INVENTION

The present invention, which will be described subsequently in greater detail, comprises a "spin-off" fluid filter device having a housing with a filter element disposed therein and a cap member enclosing one end of the housing. A "spin off" filter device as the term is used herein means the type of filter device wherein a portion of the housing containing the filter element is spun off a cap member when the element becomes clogged and is thrown away with the dirty filter element.

The cap member has an inlet and an outlet respectively in fluid communication with the exterior and interior of the filter element such that the normal flow of fluid is from the inlet through the filter element in a filtering relationship to remove contamination from the fluid and externally of the filter element by means of the outlet.

A bypass valve carried by the cap member is responsive to a predetermined pressure differential between the inlet and outlet to bypass fluid flow from the filter element and to directly connect the inlet with the outlet.

The inlet and outlet are separated by a partition having a bore disposed about an axis which is generally perpendicular to the axes of the inlet and outlet. The bypass valve in part takes the form of a piston slidingly mounted within the bore and has an elongated connecting rod extending from one side of the piston into a second bore of a decreased diameter with respect to the first bore. The elongated connecting rod is operatively connected to an indicating means mounted exteriorly of the housing. The indicating means is adapted to give a visual indication of the condition of the filter element, as well as whether or not the device is in a bypass condition, to an attendant of the system. The end of the elongated connecting rod is provided with a slot which is slidably engaged by a connecting pin carried by the indicating means, which, in turn, is mounted for rotational movement about a predetermined axis; the connecting pin being carried by the indicating means at a point offset from its axis of rotation. This unique arrangement permits rotational movement of the indicating means upon sliding axial movement of the piston, providing a simple and compactly constructed bypass valve and indicating means especially suitable for use with filter devices where space is at a premium as for instance in the cap member of a spin off type filter device.

It is therefore an object of the present invention to provide a fluid filter device having a bypass valve operatively connected to an indicating means in a relatively simple fashion for providing an accurate indication of the condition of the filter element carried within such a fluid filter device.

It is also an object of the present invention to provide a bypass valve and indicating means combination which is simple in construction, compact in design; and which reduces the overall size of the fluid filter device so that the combination is especially suitable for use in the cap member of spin off type filter devices.

Other objects, advantages, and applications of the present invention will become apparent to those skilled in the art of fluid filter devices when the accompanying description of an example of the best mode contemplated for practicing the invention is read in conjunction with the accompanying drawing.

DESCRIPTION OF THE DRAWING

The description herein makes reference to the accompanying drawing wherein like reference numerals refer to like parts, and in which.

DESCRIPTION OF THE PREFERRED EMBODIMENT

Figure 3:
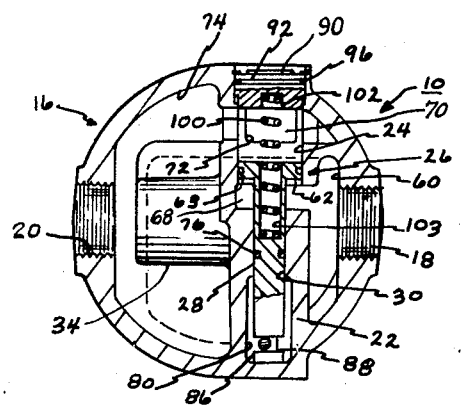
FIG. 3 is a cross sectional view of the fluid filter device taken along line 3—3 of FIG. 2.

Referring now to the drawing wherein there is illustrated a preferred embodiment of the present invention in the form of a fluid filter device 10, commonly known as a "spin-off" filter, of the type adapted to be connected in an in-line fashion to a conduit which is carrying the fluid that is desired to be filtered.

Figure 1:
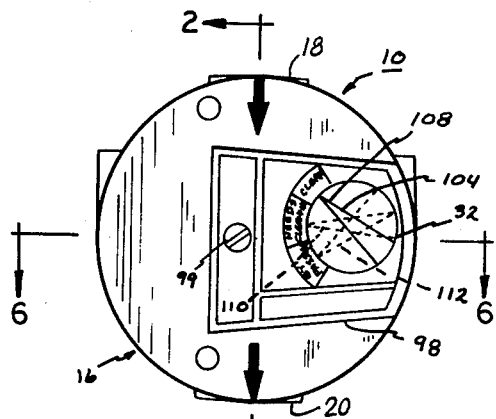
FIG. 1 is a top plan view of a fluid filter device incorporating the present invention.
Figure 4:
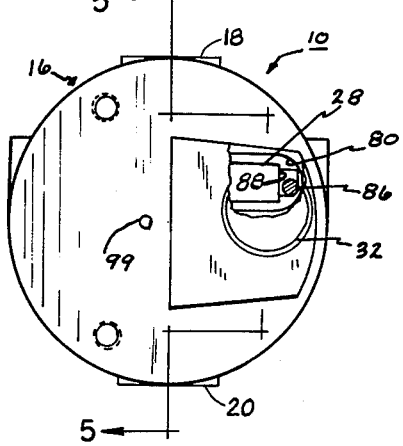
FIG. 4 is a top plan view of the fluid filter device, similar to FIG. 1, with portions thereof shown in section.

The fluid filter device 10 comprises a housing 12 in which a cylindrically shaped filter element 14 is mounted in a manner which will be described in greater detail hereinafter. The fluid filter device 10 further comprises a cap member 16 having an inlet port 18 and an outlet port 20 separated by a central partition 22 disposed generally at right angles to the line of flow between the inlet and outlet ports. The partition 22 has a bore 24 in which a bypass valve 26 is slidably mounted for reciprocal movement along the longitudinal axis 25 of the bore 24. The bypass valve 26 has an elongated connecting rod 28 extending from one surface thereof into a second bore 30 which is axially aligned with the bore 26 but of a decreased diameter. The connecting rod 28 is operatively coupled to an indicating disc 32 which as can best be seen in FIG. 1 is mounted exteriorly of the filter device on the cover 16. The manner in which the bypass valve 26 operates, and the manner in which it is operatively coupled to the indicating disc 32 will be described in greater detail hereinafter.

The inlet port 18 and the outlet port 20 are disposed in the cap member 16 and are axially aligned so that the cap member 16 may be connected with a pair of axially aligned conduits in an in-line fashion. A boss 34 extends downwardly from the lower surface of the cap member 16 and is centrally disposed with respect to the outer periphery of the cap member 16. The boss 34 has an internal bore 36, (FIG. 2), one end of which is in direct communication with the outlet port 20, while the other end is in fluid communication with the interior 38 of the filter element 14. The lower outer section of the boss 34 has a threaded surface 40 which engages a mating threaded surface 42 formed on a disc flange 44. Disc flange 44 has a plurality of annularly spaced apertures 46 for a purpose which will be described hereinafter. The outer edges of the disc flange 44 are tightly secured to an outer shell 48 of the housing 12 by means of an annular lip portion 50. The outer shell 48 takes the form of a cylindrical container opened at its upper end. The filtering element 14 is disposed within the shell 48 and has an annular seal 52 disposed between the top portion of the filtering element 14 and the bottom of the disc flange 44 to provide a fluid tight seal between the exterior and the interior of the filtering element 14.

A spring 54 disposed between the innermost wall of the shell 48 and the bottom of the filtering element 14 biases the filtering element 14 and the annular seal 52 into a sealing engagement with the disc flange 44.

A recessed portion 56 provided around the lower peripheral edge portion of the cover 16 is adapted to receive an annular seal 58, which in turn, is carried by the lip portion 50. It can thus be seen that when the disc flange 44 is threadably engaged to the boss 34, the seal 58 will engage the recess 56 in a fluid tight relationship, preventing leakage of fluid from within the shell 48.

Figure 2:
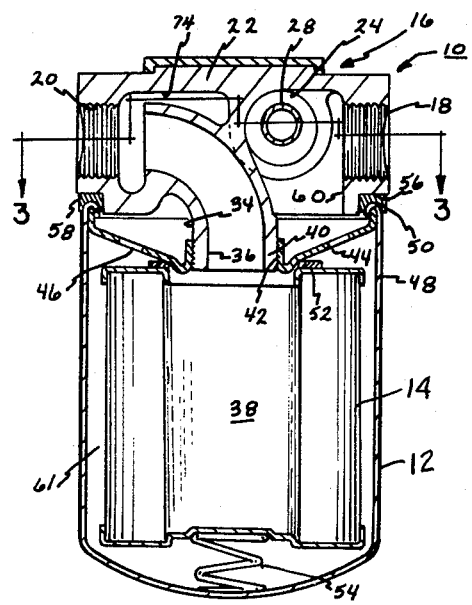
FIG. 2 is a cross sectional view of the fluid filter device taken along line 2—2 of FIG. 1.

The cover 16 has a cored passageway 60 which fluidly connects the inlet port 18 to the lower surface of the cover 16 and, as can best be seen in FIG. 2, the cored passageway 60 directs fluid from the inlet port 18 to an outer chamber 61 defined by the inner wall of the shell 48 and the exterior surfaces of the boss 34 and the filtering element 14.

During normal operation of the device 10, fluid enters the inlet port 18, flows downwardly through the cored passageway 60, through the annularly spaced apertures 46 formed within the disc flange 44, and into the outer chamber 61 of the housing 12. Fluid filters radially through the walls of the filter element 14 and into the interior 38, flows axially upwardly into the bore 36 of the boss 34 and flows externally of the filter device 10 by means of the outlet port 20.

The filter element 14 is of a conventional type, commercially available, and thus a further detailed description thereof is not necessary.

The filter element 14 is normally adapted to filter foreign particles from the fluid flow. After an extended period of use, the filter element 14 tends to become clogged and produces a pressure differential between the interior and exterior portions thereof; and, thus creates a corresponding pressure differential between the inlet port 18 and the outlet port 20. This pressure differential acts against the bypass valve 26 causing the same to be displaced until it reaches a position producing direct communication between the inlet port 18 and the outlet port 20. Although it is undesirable to have unfiltered fluid flowing through a fluid system, fluid must be provided past the filtering element 14 when the same becomes clogged, as the components normally used in such systems downstream of the filter device 10 can become seriously damaged if fluid is prevented from bypassing the clogged filtering element 14 and such system components are fluidly starved.

Figure 6:
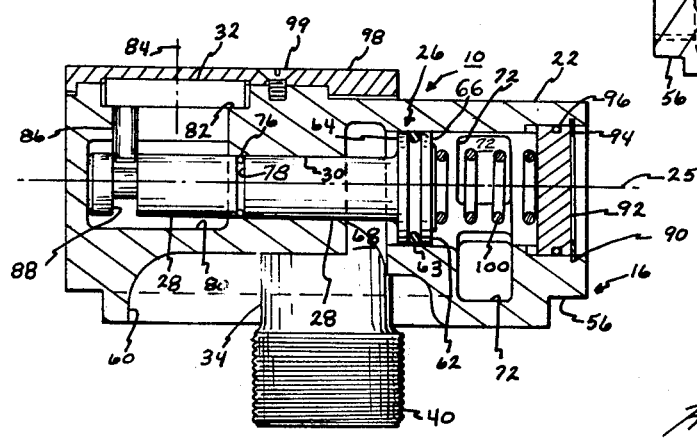
FIG. 6 is a fragmentary cross sectional view of the fluid filter device taken on line 6—6 of FIG. 1.
Figure 5:
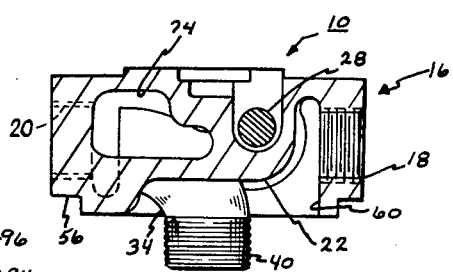
FIG. 5 is a fragmentary cross sectional view of the fluid filter device taken on line 5—5 of FIG. 4.

Referring now to FIGS. 3, 5 and 6 for a detailed description of the bypass valve 26 and the indicating disc 32, the bypass valve 26 comprises a cylindrically shaped piston member 62, the outer periphery of which slidably engages the wall of the bore 24. An O-ring 63 carried within a recess on the outer periphery of the piston member 62 engages the wall of the bore 24 in a fluid tight relationship to prevent leakage between the opposite sides 64 and 66 (FIG. 6) of the piston member 62. The piston member 62 divides the bore 24 into two chambers 68 and 70, which are respectively associated with the piston sides 64 and 66. The chamber 68 is in constant direct fluid communication with the inlet port 18 by means of the cored passageway 60. The partition bore 24 has a plurality of annularly spaced openings 72 which, as can be best seen in FIGS. 3 and 6, fluidly connect the chamber 70 with the outlet port 20 by means of a cored passageway 74 (FIGS. 3 and 5).

The connecting rod 28 extends from the piston surface 64 and slidably engages the bore 30 for relative reciprocal movement therein as the piston member 62 reciprocates within the bore 24. A seal 76 carried in a peripheral recess 78 on connecting rod 28 prevents fluid leakage from the chamber 68. The projecting end of the connecting rod 28 is disposed in a recessed portion 80 formed in the partition 22. The recessed portion 80 has a step portion 82 (FIG. 6) on which the indicating disc 32 is rotatably mounted. The indicating disc 32 and the step portion 82 are so sized as to permit the disc 32 to rotate about a vertical axis 84 which is perpendicular to and spaced away from the longitudinal axis 25 of the bores 24 and 30.

The connecting rod 28 is operatively coupled to the indicating disc 32 by means of a connecting pin 86 which is carried on the underside of the indicating disc 32 with the longitudinal axis of the pin 86 being parallel to the axis 84, but offset therefrom by a predetermined distance. The lower portion of the connecting pin 86 is received within a slotted portion 88 formed at the projecting end of the connecting rod 28. As the connecting rod 28 reciprocates within the bore 30, the pin 86 will move therewith. Since the connecting pin 86 is carried by the disc 32, the pin 86 will rotate about the axis 84 and thus as the connecting rod 28 reciprocates, the pin 86 will cause the indicating disc 32 to rotate. As the connecting pin 86 rotates in opposite directions with respect to the axis 84, the lower end of the pin 86 will reciprocate across the longitudinal axis 25 within the slotted portion 88.

The piston member 62 and the connecting rod 28 integrally formed therewith are initially inserted within their respective bores 24 and 30 during assembly of the device 10 by means of an opening 90, as can be best seen in FIGS. 3 and 6. After insertion of the bypass valve 26, the opening 90 is closed by a plug 92 and retained in position by a retainer 94. O-ring 96 prevents fluid leakage from the chamber 70 past the plug 92. After insertion of the connecting rod 28 within the bore 30, the disc 32 is positioned within the step portion 82 with the pin 86 being received by the slotted portion 88. A transparent cover plate 98 (FIG. 1) is secured to the top of the cover 16 by means of a screw 99 for retaining the indicating disc 32 in place and for preventing the entry of foreign matter into the recess 80.

It should be noted that since O-ring seal 76 carried by the connecting rod 28 prevents fluid communication between the chamber 68 and the recess 80, the indicating disc 32 is maintained in a relatively clean state during operation.

A spring 100 is provided within the chamber 70 and has one end disposed within a recess 102 formed in plug 92, while the other end thereof is received by an internal bore 103 extending through the piston member 62 and into the connecting rod 28 such that the bypass valve 26 is normally biased away from the openings 72 to prevent fluid communication between the chamber 68 and the outlet port 20.

Since the chambers 68 and 70 are respectively in constant fluid communication with the inlet and outlet ports of the filter device 10, the pressure differential existing between the inlet and outlet ports, as determined by the clogged condition of the filter element 14 will exist between the two opposite sides 64 and 66 of the piston member 62. As this pressure differential increases due to the clogged condition of the filter element 14, the resultant forces exerted against the piston member 62 will cause the piston member 62 to be shifted rightwardly as viewed in FIG. 6 against the bias of the spring 100 and toward the bore openings 72.

When the bypass valve 26 is in the position illustrated in FIG. 6, the pressure differential across the piston member 62 is very nominal as the filter element 14 is filtering in an unclogged state. When the piston member 62 is in this position, the projecting end of the connecting rod 28 is likewise in the position illustrated in FIG. 6. A pointer 104 carried on the top side of the indicating disc 32 will indicate that the filter element 14 is clean, as is indicated at 108 in FIG. 1. As the filter element 14 tends to become clogged, the piston member 62 will be shifted to the right, and thus the pin 86 will be rotated about the axis 84, carrying the pointer 104 therewith. As the pressure differential between the opposite sides of the piston member 62 increases, reflecting the increased clogged state of the filter element 14, the piston member 62 will be shifted toward the opening 72, causing the disc 32 and the pointer 104 carried thereby to rotate to the position designated in phantom at 110, which will indicate to an attendant of the device that the filter element 14 is becoming clogged and is in need of replacement.

When the clogged condition of the filter element 14 reaches the state where fluid flow therethrough is at a point which would starve the fluid system, the pressure differential on opposite sides of the piston member 62 is such that the piston member 62 will be shifted rightwardly as viewed in FIG. 6 until the piston side 64 clears the left edges of the openings 72, thereby opening a direct fluid path between the inlet port 18 and the outlet port 20. When the piston member 62 is at a position in which fluid flows from the inlet port 18, through the openings 72 and to the outlet port 20, the pointer 104 will have been rotated to the position indicated by the numeral 112 in FIG. 1, and thus indicating to an attendant that the bypass valve 26 is causing the fluid to bypass the filter element 14 and that the filter element 14 requires immediate replacement as the system is receiving unfiltered fluid.

When the attendant becomes aware that the filter element 14 requires replacement, he disconnects the source of fluid by any suitable valving (not shown) and simply disengages the housing 12 from the threaded boss 34. The housing 12 including the disc flange 44, filtering element 14 and the spring 50 are of a disposable design. A new housing 12 having the disc flange 44 and a clean filter element 14 biased into position by the spring 50, as described hereinbefore, is inserted on the threaded portion 40 of the boss 34 and screwed in place until the annular seal 58 is tightly secured within the recess 56 as described hereinbefore. Fluid is then supplied to the inlet port 18 wherein it is directed into the chamber 61 between the filtering element 14 and the shell 48, through the filtering element 14 in a filtering relationship and externally of the filter device 10 by means of the boss bore 36 and the outlet port 20. When a new filter element 14 has been installed on the device 10, the pressure differential between the inlet and outlet ports is nominal and the piston 62 will be biased by the spring 100 to its non-bypassing position; that is, the surface 66 of the piston 62 will be shifted leftwardly of the left edge of the openings 72, as viewed in FIG. 6.

It can thus be seen that the present invention has provided a fluid filter device of a spin-off construction having a number of advantages in which the hereinbefore described fluid filter devices lacked. First, the reusable elements of the filter device 10, and particularly the bypass valve 26 and the indicating disc 32 are carried by a cap member 16 which remains connected to the fluid conduits both at the inlet and outlet sides thereof, permitting easy removal and replacement of the housing 12. Secondly, the cap member 16 is so designed that the partition 22, the bypass valve 26, and the indicating disc 32 are nestled between the inlet and outlet ports of the filter device 10 in a manner which permits the construction of a relatively compact cap member, thereby utilizing a minimum amount of space, as such filter devices are normally disposed in areas in which there is a limited amount of work space available.

It can also be seen that the present invention has provided a fluid filter device having a bypass valve operatively connected in a simple fashion to an externally mounted indicating disc which is reliable and of such a construction as to insure a long life.

Although only one embodiment of the invention has been described, it will become apparent to those skilled in the art of fluid filter devices that many changes may be made therein without departing from the spirit of the invention or the scope of the appended claims.

What is claimed is as follows:
1. A fluid filter device comprising:
a housing;
a filter element disposed in said housing;
a cap member carried by said housing and enclosing said housing;
an inlet port and an outlet port carried by said cap member, said inlet port and said outlet port being disposed along a common axis;
passage means in said cap member connecting one of said ports to the interior or said filter element, and the other of said ports to the exterior of said filter element, whereby fluid normally flows from said inlet port through said filter element and to said outlet port;
bypass means carried by said cap member and responsive to a predetermined pressure differential between said inlet and outlet ports for bypassing flow from said filter element and directly communicating said inlet port with said outlet port, said bypass means comprising:
a partition in said cap member, said partition being located between said inlet and outlet ports and transversely disposed with respect to said common axis of said inlet port and said outlet port for fluidly separating said inlet and outlet ports, said partition having a longitudinal bore disposed along an axis which is transversely disposed with respect to said axis of said inlet port and said outlet port;
a pressure responsive member disposed in said bore and dividing said bore into two chambers, one of which is in fluid communication with said outlet port by means of an opening in said partition;
said pressure responsive member being movable along the longitudinal axis of said bore in response to an increasing pressure differential between said two chambers, said pressure responsive member being displaced along said bore beyond said opening to permit direct fluid communication between said inlet port and said outlet port through said opening at said predetermined pressure differential;
means normally biasing said pressure responsive member to the position below said opening for preventing direct fluid communication at a pressure differential below said predetermined pressure differential;
an elongated connecting rod extending from one surface of said pressure responsive member;
a second bore in said partition, said second bore being of a decreased diameter with respect to said first mentioned bore, said connecting rod being slidably supported in said second bore;
sealing means disposed between said connecting rod and said second bore for preventing fluid communication beyond said sealing means;
said cap member having a recessed portion, indicating means rotatably mounted in said recessed portion about an axis which is perpendicular to and spaced from the longitudinal axis of said elongated connecting rod, said indicating means having a connecting member fixedly attached to the underside thereof and extending into said recessed portion, the longitudinal axis of said connecting member being parallel to and spaced from said axis of rotation of said indicating means such that said indicating means is rotated by said connecting member when the same is arcuately displaced about said axis of rotation of said indicating means;
said connecting rod having a slotted portion transversely disposed with respect to the longitudinal axis of said connecting rod and slidably receiving the extending end of said connecting member, said slotted portion in said connecting rod being disposed beyond said sealing means;
said connecting member being reciprocated within said slotted portion and arcuately displaced about said axis of rotation of said indicating means to rotate said indicating means as the walls of said slotted portion engage said connecting member as said connecting rod is displaced in response to the movement of said pressure responsive member, whereby said indicating means indicates the position of said pressure responsive member with respect to said opening.

* * * * *

UNITED STATES PATENT OFFICE
CERTIFICATE OF CORRECTION

Patent No. 3,670,889          Dated June 20, 1972

Inventor(s) Carl A. Brown et al

It is certified that error appears in the above-identified patent and that said Letters Patent are hereby corrected as shown below:

IN THE ABSTRACT OF THE DISCLOSURE

Line 3, following "of" insert --along--

Column 6, line 7, following "interior"
       delete "or" and substitute --of--

Signed and sealed this 3rd day of October 1972.

(SEAL)
Attest:

EDWARD M. FLETCHER, JR.                ROBERT GOTTSCHALK
Attesting Officer                      Commissioner of Patents